Patented Jan. 8, 1952

2,581,514

UNITED STATES PATENT OFFICE 2,581,514

PRODUCTION OF THIASUCCINIC ACID DERIVATIVES

Wilbur B. Chilcote, Hammond, Ind., assignor to Standard Oil Company, Chicago, Ill., a corporation of Indiana No Drawing. Application November 30, 1949, Serial No. 130,370

5 Claims. (Cl. 260—537)

This invention relates to a novel process for the production of thia-hydrocarbon succinic acids. More particularly, it relates to a process for the production of thia-hydrocarbon succinic acids by the interaction of non-tertiary hydrocarbon thiols containing no aliphatic unsaturation with the maleic ion in aqueous alkaline solution.

One object of my invention is to provide a novel and economical process for the production of thia-hydrocarbon succinic acids. Another object of my invention is to provide a process wherein water is employed as the reaction medium for the interaction of a saturated non-tertiary hydrocarbon thiol with maleate ions. An additional object of my invention is to provide cheap catalysts and water as the reaction medium for the production of thia-alkyl succinic acids from maleic acid and a saturated non-tertiary hydrocarbon thiol. Still another object of my invention is to provide a process for the production of thia-alkyl succinic acids in which the recovery of the desired reaction products can be accomplished cheaply and with ease. These and other objects of my invention will become apparent from the ensuing description thereof.

I have made the surprising discovery that water is an excellent reaction medium for the production of thia-alkyl succinic acids, particularly 2-(1-thia-alkyl) succinic acids by the reaction of a non-tertiary hydrocarbon thiol containing no aliphatic unsaturation with an alkali metal maleate in water solution containing at least about 0.25 mol of free LiOH, NaOH or KOH per mol of maleate salt, in spite of the fact that thiols of the above description are, at best, only sparingly soluble in water. I have made the surprising observation that the two-liquid phase reaction system of my invention readily produces the desired thia-hydrocarbon succinic acid in higher yields and shorter reaction periods than the corresponding reactions effected in homogeneous solutions in organic reaction media. Moreover, I have discovered that ethanol and n-butanol, which are frequently employed as coupling solvents between water and alkalies such as NaOH and KOH, reduce the reaction rate and yield of product in the reactions here under consideration. This is remarkable as ethanol or butanol solubilizes the thiol or mercaptan in the reaction system.

In the process of the present invention one mol of alkali metal maleate in solution in water reacts with one mol of an immiscible saturated alkyl non-tertiary hydrocarbon thiol to produce the alkali metal salt of 2-(1-thia-alkyl) succinic acid or 2-(1-thia-aryl) succinic acid from which the free substituted succinic acid can be liberated.

A considerable variety of immiscible saturated non-tertiary hydrocarbon thiols may be employed for the practice of the present invention and usually these thiols contain between about 1 and about 30 carbon atoms per molecule. The saturated hydrocarbon radical combined in the hydrocarbon thiol is a non-tertiary alkyl or cycloalkyl radical. Examples of suitable alkyl radicals include methyl, ethyl, n-propyl, isopropyl, n-butyl, 2-methylpropyl, 2-phenylpropyl, n-amyl, isoamyl, n-octyl, benzyl, beta-phenylethyl, n-dodecyl, n-tetradecyl, n-octadecyl, naphthomethyl and the like. Examples of suitable non-tertiary cycloalkyl radicals include cyclobutyl, cyclopentyl, cyclohexyl, sec-methylcyclopentyl, sec-methylcyclohexyl, sec-[2,2,1]bicycloheptyl and the like. In general, it is preferred to employ mono-thiols but the reaction in question is also extensible to di-thiols or poly-thiols, for example 1,2-ethanedithiol, 1,4-phenylenedithiol and similar compounds. The molar ratio of thiol to maleate salt charged to the reaction zone can be varied within the range of about 1 to about 10 and is preferably between about 1 and about 2.

The reaction can be conducted at temperatures in the range of about 25 to about 150° C., preferably between about 75 and about 125° C. The reaction is conveniently conducted at steam bath temperatures, i. e., about 100° C. The reaction is conducted in the liquid phase, so the pressure in the reaction zone should be sufficient to maintain the reactants in the liquid phase. Normally, pressures between about 0 and about 500 p. s. i. g. can be employed.

The reaction rate is favorably affected by providing a high concentration of the maleic ion in the water solution. I may employ between about 1 and about 130 mols of water per mol of maleate ion, preferably between about 4 and about 20 mols.

The basic catalysts employed in the practice of the invention are NaOH, KOH or LiOH. In order to obtain rapid reaction rates and high yields of product it is desirable to employ at least about 0.25 mol of the free alkali per mol of neutral salt of maleic acid in the water solution, although I may employ up to about 5 mols of the alkali catalyst per mol of neutral maleic salt and usually employ 1 mol or more of the alkali catalyst. The use of excessive amounts of alkali creates an expense and nuisance when it is desired to convert the thia-hydrocarbon succinate salt to the free acid, but does not otherwise appear to be substantially deleterious in the reaction.

Sufficient time is provided to obtain substantial reaction, usually between about ¼ and 20 hours, preferably between about 1 and about 9 hours.

The following examples are provided for the purpose of illustrating but not unnecessarily limiting the invention.

EXAMPLE 1

Maleic anhydride, 98 grams (1 mol), and 110 grams of water were placed in a 3-neck flask equipped with a stirrer, water-cooled condenser and a thermometer. To the suspension of maleic anhydride and water, maintained by rapid stirring, 168 grams (3 mols) of potassium hydroxide were added. Considerable heat is evolved and when the mixture has assumed the nature of a solution and while still at 90° C., 90 grams (1 mol) of n-butyl mercaptan were added. The mixture was stirred vigorously and held at 96° C. for 2 hours. At the conclusion of the two hours of heating the reactants were cooled and acidified to a pH of 2 with concentrated hydrochloric acid, and then evaporated to dryness on a steam bath. The resulting waxy solid was pulverized and extracted with dry benzene. Evaporation of the benzene sol yielded 186 grams of material giving the following inspections:

S calc'd., 15.55 w. percent; found, 15.5 w. percent
Neutral equivalent—394
Melting point—144.5° C.

This material has the type formula

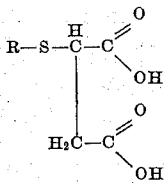

The yield of product was 90% of theoretical.

When 95 percent ethanol was substituted in equal volume for water as the reaction medium, the yield of 2-(1-thia-amyl) succinic acid was only 68 percent after a 9 hour reaction period at 79° C. It will be noted also that the highest permissible reaction temperature at atmospheric pressure was limited by the lower boiling point of the ethanol as compared with water. When no free KOH is present in the reaction mixture, the yield of n-thia-amyl succinic acid even after 4 hours under otherwise identical conditions is only 47.5%.

EXAMPLE 2

Maleic anhydride (0.45 mol) was dissolved with heating in 120 cc. of water. The resulting solution was cooled and 1.5 mols of pellet KOH were slowly added to the stirred solution. The mixture was cooled to 50° C. and 0.5 mol of n-dodecanethiol added. The mixture was heated at 60–100° C. for 3 hours. It was impossible to keep the reaction at the reflux at (100° C.) because of foaming. A very stable emulsion is formed. The mixture was cooled and acidified to a pH of 2 with dilute HCl, and dried with stirring at 96° C. in a current of warm nitrogen. The resulting paste was cooled, powdered and oven dried at 80° C. for 24 hours. The dried powder was then extracted with benzene in a Soxhlet extractor with a water trap in the condensing area. Evaporation of the benzene extract yielded 117.6 grams of material giving the following inspections.

Neutral equivalent=214 (theory=252)
Wt. percent S=10.06 (theory=10.05)
M. P. (purified)—97.5° C.

The yield of product (2-(1-thiatridecyl) succinic acid) was 75% of theoretical.

In carrying out the above examples it was noted that while water did not dissolve much of the mercaptan, it did dissolve all of the reaction product (potassium thia-alkyl succinate). It thus appears that the rate determining step in the present process is one associated with an ionizing solvent and one which is accelerated markedly by high concentrations of the reaction product.

Similar operations to those described above were carried out employing various mercaptans and potassium maleate as reactants using the solvents and conditions set forth in the following table.

Table 1
EFFECT OF SOLVENT ON YIELDS OF THIA-ALKYL SUCCINIC ACID
All reactions at reflux temperature
KOH catalyst: 100 mol. percent (1 mol in excess of amount needed to neutralize maleic acid, except as indicated).

| Ex. | Mercaptan | Mols RSH per Mol K Maleate | Solvent | Mols solvent: 1 mol Maleate | Time, hours | Temp., °C. | Yield, percent of Theory |
|---|---|---|---|---|---|---|---|
| 3 | n-butanethiol | 1 | ethanol (95%) | 6.9 | 9 | 79 | 68 |
| 4 | n-butanethiol | 1 | water | 6.1 | 2 | 90–98 | 91 |
| 5 | n-dodecanethiol | 1 | n-butanol | 4.4 | 12 | 117 | 0.5 |
| 6 | n-dodecanethiol | 1 | ethanol (95%) | 3.5 | 9 | 70–80 | 30 |
| 7 | n-dodecanethiol | 1 | water | 13.0 | 3 | 98 | 85 |
| 8 | ethanethiol | 2 | water | 5.5 | 36 | 35 | 68 |
| 9 | n-octanethiol | 1 | water | 13.5 | 2 | 68–110 | 40 |

It will be noted from comparison of the above examples that the employment of water as a reaction medium resulted in a remarkably high yield of desired product after a relatively short reaction period. It is remarkable that a high molecular weight mercaptan such as n-dodecanethiol, which is substantially insoluble in water, gives such high reaction rates and good yields with water as the reaction medium (Example 7), whereas the presence of ethanol or n-butanol (Examples 5 and 6), which function as coupling solvents to solubilize the high molecular weight mercaptan in the reaction system, markedly lowered the reaction rate and yield of product even after extended reaction periods.

I have noted that the employment of tertiary alkyl mercaptans leads to relatively low yields in the case of t-butyl mercaptan and, in the case of higher tert-alkyl mercaptans such as t-dodecanethiol, to no yield whatsoever of the desired thia-alkyl succinic acid.

Melting points of the 2-(1-thia-alkyl) succinic acids which I have produced are set forth in the following table.

Table 2
MELTING POINTS OF THIA-ALKYL SUCCINIC ACIDS

| Mercaptan Feed | Succinic Acid Product | Melting Point, °C. |
|---|---|---|
| methyl | 1-thiaethyl | 133 |
| ethyl | 1-thiapropyl | 119.5 |
| n-propyl | 1-thiabutyl | 112 |
| n-butyl | 1-thiapentyl | 144.5 |
| t-butyl | 3-methyl, 1 thiabutyl | 164 |
| n-amyl | 1-thiahexyl | 99.5 |
| iso-amyl | 3-methyl, 1 thiapentyl | 215 |
| n-octyl | 1-thianonyl | 91 |
| n-dodecyl | 1-thiatridecyl | 97.5 |

The thia-hydrocarbon succinic acid products of the present invention can be purified by solution in aqueous dilute hydrochloric acid, extraction with diethyl ether and recrystallization of the soluble acids from hot benezene. Maleic and fumaric acids are practically insoluble in benzene and the thia-hydrocarbon succinic acids can, thus, be separated from unconverted maleic acid.

The thia-hydrocarbon succinic acids produced by the present process are adaptable to a considerable number of chemical conversions and uses. Thus, the thia-alkyl succinic acids or hydrocarbon oil-soluble soaps thereof in which the alkyl group contains between about 10 and about 20 carbon atoms, for example 12 carbon atoms, may be employed in hydrocarbon oils such as lubricating oils, furnace oils, Diesel oils, etc. in proportions between about 0.01 and about 5.0 percent as oiliness and antirust agents.

The thia-alkyl succinic acids, for example 2-(1-thiatridecyl) succinic acid and its sodium, potassium, ammonium or amine salts may be employed as detergents, wetting agents and emulsifying agents, the desired variations in properties being obtainable by variations in the molecular weight of the alkyl group and in the neutralizing agent.

The thia-hydrocarbon succinic acids may also be treated with ethylene oxide, propylene oxide or the like to produce polyalkylene oxide derivatives which may thereafter be sulfated to produce wetting agents and detergents.

The thia-hydrocarbon succinic acids can be subjected to a variety of chemical conversions to produce products of value and interest. Thus, oxidation may be effected at the sulfur atom in these compounds by means of oxidizing agents such as hydrogen peroxide to produce sulfoxo and sulfono derivatives. For example, 2-(1-thiapropyl) succinic acid may be esterified by conventional methods to produce the dioctyl or dinonyl ester thereof and oxidized at the sulfur atom to produce an ethylsulfonosuccinic ester which may be employed as a plasticizer in various synthetic resins and rubbers, for example in proportions between about 5 and about 50 percent by weight in vinyl chloride-vinyl acetate copolymers (the Vinylites).

The thia-hydrocarbon succinic acids can be converted to a variety of salts or soaps. Of these, the heavy metal soaps such as calcium, aluminum, barium or lead soaps may be employed in the formulation of greases and slushing compounds.

The thia-hydrocarbon succinic acids can be converted to internal anhydrides by conventional distillation, and to higher molecular weight polyanhydrides by molecular distillation. The acids produced by this invention may also be converted by conventional methods to acid chlorides, amides and esters. From the amides the corresponding substituted succinic nitrile can be produced by dehydration, for example with $P_2O_5$ or by vapor phase treatment with catalysts such as alumina or the like.

The thia-hydrocarbon succinic acids can be reacted with alkylene diamines such as hexamethylene diamine or with polyhydric alcohols, for example ethylene glycol, glycol, trimethylolpropane, pentaerythritol or the like to produce synthetic resins for use in coating materials.

The internal anhydrides obtainable from thia-hydrocarbon succinic acids can be employed in Haworth type succinoylation and cyclization reactions. The thia-alkyl succinic acids may be condensed with dialkylaminophenols to produce substituted rhodamine type dyes, this treatment permitting the control of color and solubility of the dyes. The thia-alkyl succinic acids may also be employed in other dye synthesizing operations.

The thia-alkyl succinic acids may also be employed as pickling inhibitors for pickling acids such as sulfuric and hydrochloric acids.

Having thus described my invention, what I claim is:

1. A process for the production of a 2-(1-thia-alkyl) succinic acid which comprises contacting a solution of an alkali metal maleate in an aqueous alkali selected from the class consisting of LiOH, NaOH and KOH, said solution containing substantially no organic solvent, said solution containing at least about 1 mol of free alkali per mol of said alkali metal maleate, at a temperature between about 75° C. and about 125° C. with an immiscible, non-tertiary, saturated, alkyl thiol containing between about 1 and about 30 carbon atoms per molecule, and separating a 2-(1-thia-alkyl) succinic acid thus produced.

2. A process for the production of a 2-(1-thia-alkyl) succinic acid which comprises contacting a solution of an alkali metal maleate in aqueous KOH, said solution containing substantially no organic solvent, said solution containing at least about 1 mol of free alkali per mol of said alkali metal maleate, at a temperature between about 75° C. and about 125° C. with an immiscible, non-tertiary, saturated, alkyl thio containing between about 1 and about 30 carbon atoms per molecule, and separating a 2-(1-thia-alkyl) succinic acid thus produced.

3. A process for the production of a 2-(1-thia-alkyl) succinic acid which comprises contacting a solution of an alkali metal maleate in an aqueous alkali selected from the class consisting of LiOH, NaOH and KOH, said solution containing substantially no organic solvent, said solution containing at least about 0.25 mol of free alkali per mol of said alkali metal maleate, at a temperature between about 75° C. and about 125° C. with an immiscible, non-tertiary, saturated, alkyl thiol containing between about 1 and about 30 carbon atoms per molecule, and separating a 2-(1-thia-alkyl) succinic acid thus produced.

4. A process for the production of 2-(1-thia-amyl) succinic acid which comprises contacting a solution of an alkali metal maleate in an aqueous alkali selected from the class consisting of LiOH, NaOH and KOH, said solution containing substantially no organic solvent, said solution containing at least about 0.25 mol of free alkali per mol of said alkali metal maleate, at a temperature between about 75° C. and about 125° C., with n-butyl thiol and separating the 2-(1-thia-amyl) succinic acid thus produced.

5. A process for the production of 2-(1-thiatridecyl) succinic acid which comprises contacting a solution of an alkali metal maleate in an aqueous alkali selected from the class consisting of LiOH, NaOH and KOH, said solution containing substantially no organic solvent, said solution containing at least about 0.25 mol of free alkali per mol of said alkali metal maleate, at a temperature between about 75° C. and about 125° C., with n-dodecanethiol and separating the 2-(1-thiatridecyl) succinic acid thus produced.

WILBUR B. CHILCOTE.

REFERENCES CITED

The following references are of record in the file of this patent:

FOREIGN PATENTS

| Number  | Country | Date          |
|---------|---------|---------------|
| 845,793 | France  | Sept. 1, 1939 |